(12) United States Patent
Brenneke et al.

(10) Patent No.: US 7,296,413 B2
(45) Date of Patent: Nov. 20, 2007

(54) POWER GENERATING SYSTEM AND METHOD

(75) Inventors: Glenn S. Brenneke, Lee's Summit, MO (US); Jason Stratman, Lee's Summit, MO (US); Ohler L. Kinney, Jr., Overland Park, KS (US); Eldon F. Mockry, Lenexa, KS (US); Gregory P. Hentschel, Overland Park, KS (US); Darrin Ray Clubine, Kansas City, MO (US); Jidong Yang, Overland Park, KS (US)

(73) Assignee: Marley Cooling Technologies, Inc., Overland Park, KS (US)

( * ) Notice: Subject to any disclaimer, the term of this patent is extended or adjusted under 35 U.S.C. 154(b) by 374 days.

(21) Appl. No.: 10/965,176

(22) Filed: Oct. 15, 2004

(65) Prior Publication Data
US 2006/0080963 A1    Apr. 20, 2006

(51) Int. Cl.
*F02C 3/22* (2006.01)
*F02C 7/143* (2006.01)

(52) U.S. Cl. .................. 60/772; 60/39.465; 60/728
(58) Field of Classification Search ............ 60/39.182, 60/39.465, 39.53, 772, 728
See application file for complete search history.

(56) References Cited

U.S. PATENT DOCUMENTS

| 5,400,588 A | * | 3/1995 | Yamane et al. | .......... 60/39.465 |
| 5,457,951 A | * | 10/1995 | Johnson et al. | .......... 60/39.182 |
| 6,367,258 B1 | * | 4/2002 | Wen et al. | .................. 60/641.7 |
| 2003/0005698 A1 | * | 1/2003 | Keller | .................. 60/643 |

OTHER PUBLICATIONS

Dharam Punwani, "Cool Your Jets! Hybrid Systems & LNG For Turbine Inlet Cooling (TIC)", Oct. 2004, pp. 19-20, Energy-Tech. com.

* cited by examiner

*Primary Examiner*—L. J. Casaregola
(74) *Attorney, Agent, or Firm*—Baker & Hostetler LLP

(57) ABSTRACT

A power generating system having a liquid natural gas (LNG) vaporization circuit and an energy generating circuit. The LNG vaporization circuit includes a heat exchange assembly and a heating tower connected to the heat exchange assembly. The LNG vaporization circuit also includes a LNG vessel connected to the heat exchange assembly. The energy generating circuit includes a gas turbine connected to the heating tower along with a first electrical generator connect to the gas turbine.

25 Claims, 1 Drawing Sheet

POWER GENERATING SYSTEM AND METHOD

FIELD OF THE INVENTION

This invention relates generally to an apparatus and method for both imparting heat to a circulating fluid using water heated by a heating tower apparatus and providing cool, moist air to a gas turbine or the like. More particularly, the present invention relates, for example, to an apparatus and method whereby liquefied natural gas or the like, is vaporized via heat exchange, while the air temperature of the inlet air charged to the gas turbine is simultaneously reduced or cooled.

BACKGROUND OF THE INVENTION

There are times when it is desirable to cool or reduce the temperature of the inlet air charged to a gas turbine. This circumstance can arrive with respect to increasing the thermal output and efficiency of gas turbines or the like. Likewise, there are times when it is desirable to impart heat from ambient air to a relatively cool liquid to "heat" the liquid. This circumstance can arrive with respect to liquefied natural gas.

Gas turbines, which typically can comprise an air inlet, a compressor, a combustion chamber, turbines and an exhaust, function to compress incoming air flow that mixes with fuel prior to ignition of the air-fuel mixture. This ignition of the air-fuel mixture typically occurs in the combustion chamber or chambers, and causes the generation of high-temperature gas or gasses, which in turn drive the turbine. Gas turbines similar to the ones described above, are typically utilized for the generation of mechanical power for vehicles, for example aircraft power generation. Gas turbines like the ones described above are also typically utilized in the electrical power generating industry, especially during peak load periods, wherein the turbines are coupled to an electrical generator and function to drive the electrical generator.

Gas turbine usage for electrical power generation, or a gas turbine generator, is particularly prevalent during summer months to supplement normal power, such as steam or hydroelectric, generating plant during peak power demand time periods. The gas turbine generators are also used for base-load systems in smaller utilities, and for co-generation systems. It is however noted that gas generator KW output rating, or thermal efficiency, is inversely proportional to the inlet air temperature to the gas turbine generator. In other words, the gas turbine generator is less efficient with inlet air at temperatures that are elevated, while it is more efficient with inlet air temperatures that are cool or cold. Thus it is desirable to provide gas inlet streams that are cool or cold, and therefore various apparatuses and methods for reducing the temperature of inlet air to a gas turbine generator exist in the art today.

The cryogenic liquefaction of natural gas is routinely practiced as a means for converting natural gas into a more convenient form for transportation. Such liquefaction typically reduces the volume by about 600 fold and results in an end product that can be stored and transported more easily. Also, it is desirable to store excess natural gas so that it may be easily and efficiently supplied when the demand for natural gas increases. One practical means for transporting natural gas and also for storing excess natural gas, is to convert the natural gas to a liquefied state for storage and/or transportation and then vaporize the liquid as demand requires.

Natural gas often is available in areas remote from where it will ultimately be used, therefore the liquefaction of natural gas is even of greater importance. Typically, natural gas is transported via pipeline from the supply source directly to the user market. However, it has become more common that the natural gas be transported from a supply source which is separated by great distances from the user market, where a pipeline is either not available or is impractical. This is particularly true of marine transportation where transport must be made by ocean-going vessels. Ship transportation of natural gas in the gaseous state is generally not practical because of the great volume of the gas in the gaseous state, and because appreciable pressurization is required to significantly reduce the volume of the gas. Therefore, in order to store and transport natural gas, the volume of the gas is typically reduced by cooling the gas to approximately −240° F. to approximately −260° F. A this temperature, the natural gas is converted into liquefied natural gas (LNG), which possesses near atmospheric vapor pressure. Upon completion of transportation and/or storage of the LNG, the LNG must be returned to the gaseous state prior to providing the natural gas to the end user for consumption.

Typically, the re-gasification or vaporization of LNG is achieved through the employment of various heat transfer fluids, systems and processes. For example, some processes used in the art utilize evaporators that employ hot water or steam to heat the LNG to vaporize it. Other processes currently used in the art employ open rack evaporators, intermediate fluid evaporators and submerged combustion evaporators.

Open rack evaporators typically use sea water or like as a heat source for countercurrent heat exchange with LNG, while other processes employ an intermediate fluid or refrigerant such as propane, fluorinated hydrocarbons or the like, having a low freezing point. In these processes, the refrigerant can be heated with hot water or steam, and then the heated refrigerant or refrigerant mixture is passed through the evaporator and used to vaporize the LNG.

One practice currently employed in combination with the above referenced processes, is the use of atmospheric water towers, by themselves or in combination with heaters or boilers, to heat the refrigerant that acts to vaporize the LNG. In these systems, water is passed into a water tower wherein the temperature of the water is elevated. The elevated temperature water is then used to heat the refrigerant such as glycol via a first evaporator, which in turn is used to vaporize the LNG via a second evaporator.

Accordingly, there is a need in the art to provide an apparatus and method for pre-cooling or reducing the temperature of inlet air to a gas turbine generator along with providing efficient power generation.

SUMMARY OF THE INVENTION

The foregoing needs are met, to a great extent, by the present invention, wherein aspects of an energy generating apparatus and method are provided.

In accordance with an embodiment of the present invention, a power generating system is provided, comprising: a liquid natural gas (LNG) vaporization circuit, comprising: a heat exchange assembly; a heating tower connected to said heat exchange assembly; a liquid natural gas (LNG) connected to said heat exchange assembly; and an energy generating circuit connected to said liquid natural gas (LNG) vaporization circuit, said energy generating circuit, comprising: a gas turbine connected to said heating tower; and a first electrical generator connected to said gas turbine.

In accordance with another embodiment of the present invention, a method for generating power using a gas turbine having an air inlet and heating water using a heating tower is provided, comprising: drawing an air stream into the heating tower through an inlet to define an air inlet stream; passing the air inlet stream over a fill medium; passing the water over the fill medium; discharging the air stream from the heating tower through an outlet to define an air outlet stream; isolating the inlet air stream from the outlet air stream; and providing the outlet air stream to the gas turbine air inlet.

In accordance with yet another embodiment of the present invention, a power generating system having a gas turbine is provided, comprising: means for drawing an air stream into the heating tower through an inlet to define an air inlet stream; means for passing the air inlet stream over a fill medium; means for passing the water over the fill medium; means for discharging the air stream from the heating tower through an outlet to define an air outlet stream; means for isolating the inlet air stream from the outlet air stream; and means for providing the outlet air stream to the gas turbine air inlet.

In accordance with another embodiment of the present invention, a power generating system is provided, comprising: a liquid natural gas (LNG) vaporization circuit, comprising: a heat exchange assembly; a liquid natural gas (LNG) vessel connected to said heat exchange assembly; a heating tower connected to said heat exchange assembly that produces cool water; an energy generating circuit, comprising: a gas turbine connected to said heating tower; a first electrical generator connected to said gas turbine; and a cooling tower; and a cool liquid conduit that transports the cool water between said liquid (LNG) vaporization circuit and said energy generating circuit.

In accordance with yet another embodiment of the present invention, a power generating system having an energy generating circuit, comprising a gas turbine connected to the power generating system and a first electrical generator connected to the gas turbine is provided, comprising: a liquid natural gas (LNG) vaporization circuit, comprising: a heat exchange assembly; a heating tower connected to said heat exchange assembly; and a liquid natural gas (LNG) vessel connected to said heat exchange assembly.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
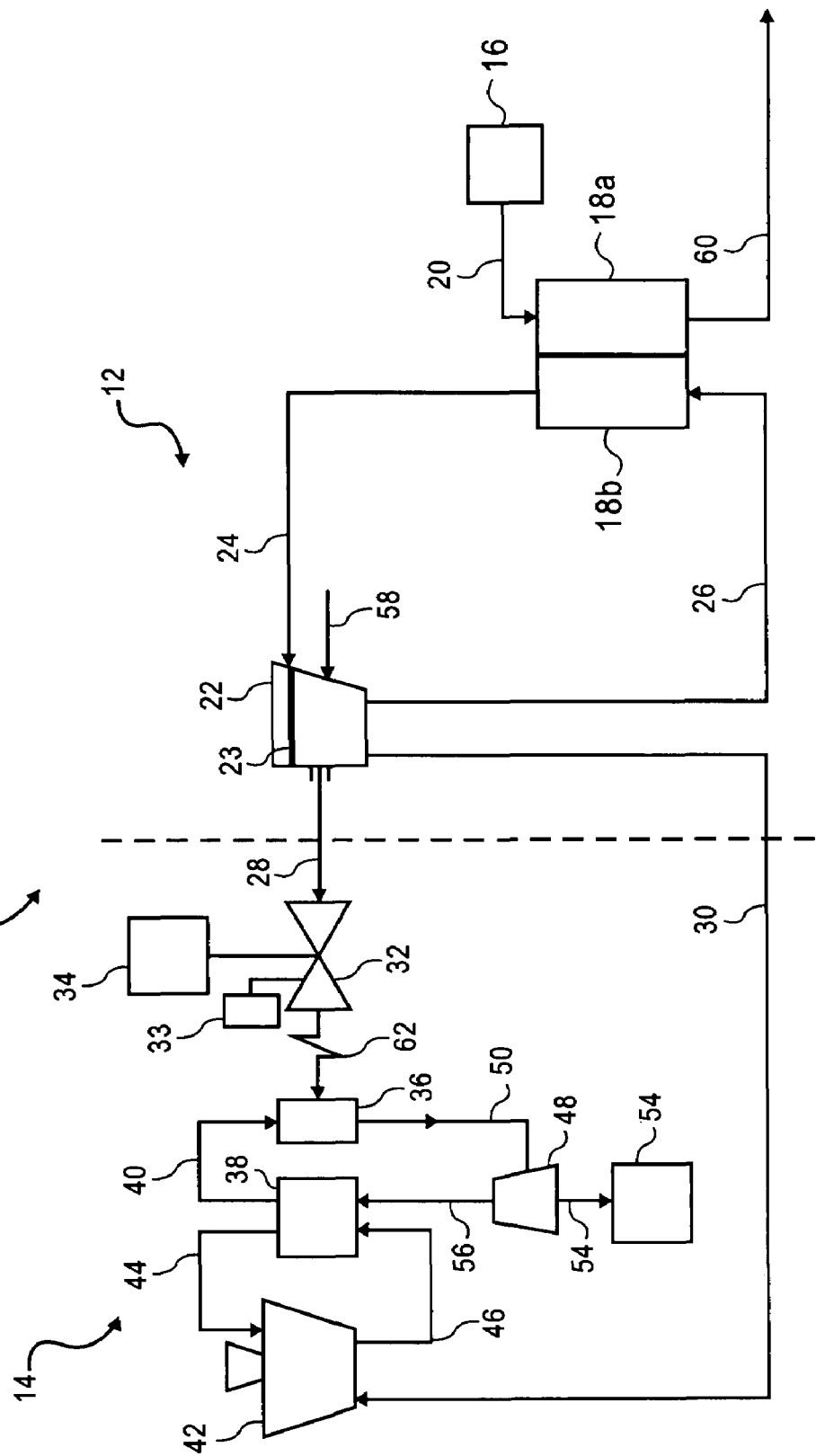
FIG. 1 is a schematic diagram of a power generating system in accordance with an embodiment of the present invention.

Various preferred embodiments of the present invention provide for a power generating system, wherein a system for imparting heat to a circulating liquid employed to cool the inlet air of a gas turbine for example. In some arrangements, the system for imparting heat to circulating liquid employs a heating tower and is utilized in vaporization of gasification systems and/or processes utilized for the vaporization of liquid natural gas (LNG). It should be understood, however, that the present invention is not limited in its application to gas turbines or gas turbine generators, but, for example, with other air consuming systems and/or other air consuming processes such as engines or heat exchangers. Preferred embodiments of the invention will now be further described with reference to the drawing FIGURE, in which like reference numerals refer to like parts throughout.

Referring now FIG. 1, an energy generating apparatus, generally designated 10, includes both a liquid natural gas (LNG) vaporization circuit or assembly, generally designated 12, and an energy generating circuit or assembly, generally designated 14.

As illustrated in FIG. 1, the LNG vaporization circuit 12 includes a LNG storage tank or vessel 16 that stores the LNG to be vaporized. The LNG storage vessel 16 is in fluid communication with, or connected to, via a conduit 20, a heat exchanger assembly 18 that preferably employs two heat exchangers 18a and 18b. The LNG vaporization circuit 12 also includes a heating tower 22 which is also in fluid communication with the heat exchanger 18 via conduits 24 and 26. As illustrated in FIG. 1, the heating tower 22, in combination with conduits 28 and 30, connects the LNG vaporization circuit 12 to the energy generating circuit 14 and vice versa.

The heating tower 22 is preferably a mechanical draft heating tower that includes a water basin and frame assembly. The heating tower further includes an inlet duct or shell that defines the heating tower air inlet and functions to isolate the air inlet and outlet streams of the heating tower 22. The inlet duct can be of any geometry however the duct is preferably has a generally hyperbolic geometry. The heating tower 22 may either have a counter flow configuration or a cross-flow configuration, depending upon the fill employed in the heating tower 22.

As depicted in FIG. 1, the energy generating circuit 14 includes a standard gas turbine 32 having a fuel source or supply 33, wherein the turbine 32 is connected to the heating tower 22 via conduit 28. The gas turbine 32 is a standard turbine and includes a combustion chamber, turbines and an exhaust. The gas turbine 32 functions to compress incoming air flow from the heating tower 22 and then mix the compressed air with fuel prior to ignition of the air-fuel mixture. The gas turbine 32 is also connected to a first electric generator 34.

The energy generating circuit 14 further includes a steam generator 36 and a condenser 38. The steam generator 36 and condenser 38 are connected to one another via a conduit 40. The energy generating circuit 14 also includes a fluid cooler 42 which is in fluid communication with the condenser 38 via conduits 44 and 46. As the name suggests, the fluid cooler 42 functions to cool the fluid exiting the condenser 38. The fluid cooler 42 may include any cooling means, for example a cooling tower, a natural water source such as river water, lake water or ocean water or a cooling tower.

For energy generating circuits the utilize a cooling tower as the fluid cooler 42, the cooling tower is preferably a standard cooling tower. By standard cooling tower, it is understood that the cooling tower is a mechanical draft tower that may have either a cross-flow configuration or a counter flow configuration, depending upon the fill media employed in the tower. It is further understood that during operation of the tower 42, water is sprayed onto the fill media while ambient air is drawn across the media and heat exchange occurs.

Returning to the energy generating circuit 14, as depicted in FIG. 1, the circuit 14 additionally includes a steam turbine 48 that is also in communication with the steam generator 36 via conduit 50. The steam turbine 48 is connected to a second electric generator 52 via a rotatable shaft 54 that turns the second electric generator 52. The steam turbine 48 is also in fluid communication with the condenser via conduit 56.

For clarity purposes, each of the circuits, the LNG vaporization circuit 12 and the energy generating circuit 14, will be described separately in detail, however it is understood that during operation of the power generating system 10, both circuits 12, 14 are in operation simultaneously.

During operation of the LNG vaporization circuit 12, LNG to be vaporized is pumped from the LNG storage vessel 16, through the conduit 20 and into the heat exchanger assembly 18. While the LNG is pumped into the heat exchanger assembly 18, ambient air is simultaneously being drawn into the heating tower 22 as indicated by the arrow 58 via mechanical drafting means. Also during this time period, cool or cold water from the exchanger assembly 18 is also delivered to the heating tower 22 via conduit 24. Upon its arrival at the heating tower 22, the cool water is delivered to a water distribution assembly or the like 23, where the water is in turn sprayed on a fill media while the ambient air is drawn through the fill media. As the ambient air contacts the fill media and the cool liquid falling thereon, a heat exchange occurs, imparting heat on the water, elevating the temperature of the water within the heating tower 22, while causing the air to become very cool and moist. Furthermore, as the aforementioned heat exchange occurs, moisture is condensed out of the air and a quantity of water is produced. This quantity of water is then transported or pumped to the energy generating circuit 14 via conduit 30, as illustrated, where it is utilized to replenish or restore the water of the cooling tower 42 that evaporates during its operation.

As illustrated in FIG. 1, the cool, moist air is transported out of the heating tower via conduit 28 while the warm water is pumped through conduit 26 to the heat exchanger assembly 18. Once the heated water reaches the heat exchanger assembly 18, it passes through the first heat exchanger 18*a* where it travels through suitable fins, coils and other passages or the like, so as to transfer heat from the heated water to a circulating, intermediate fluid. The intermediate fluid preferably has a low freezing point, such as glycol or the like, and therefore does not freeze when it enters the second heat exchanger and interacts with the LNG. The intermediate fluid is typically very cold due to its heat exchange interaction with the LNG, which will be described in further detail below, therefore after the heat exchange between the water and the intermediate fluid, the water becomes very cold. This cold water is then returned to the heating tower 22 via the conduit 24 where it is reheated as previously described above.

The intermediate fluid preferably has a low freezing point, such as glycol or the like, and therefore does not freeze when it enters the second heat exchanger and carries out the heat exchange with the LNG, which effects the elevation of the temperature of the intermediate fluid.

Once the heated intermediate fluid leaves the first heat exchanger 18*a* of the heat exchange assembly 18, it proceeds to the second heat exchanger 18*b* within the heat exchange assembly 18 where the heat exchange between the LNG and the intermediate liquid occurs. At the second heat exchanger 18*b*, the heated intermediated fluid flows through suitable fins, coils and/or other passages or the like, similar to the first exchanger 18*a*. As the heated intermediate fluid flows through the aforementioned passages, heat is imparted on the LNG, which simultaneously flows through a separate set of fins, coils and/or other passages. As the aforementioned heat exchange occurs, the temperature of the LNG rises to the extent that the LNG starts to vaporize and the LNG converts from the liquid state into the gaseous state. The natural gas is then pumped from the heat exchanger assembly 18 via a conduit 60 where it may be utilized in marketplace.

As previously mentioned, while the LNG vaporization circuit 12 is in operation, the energy generating circuit 14 is also in operation simultaneously. As illustrated in FIG. 1, during operation of the energy generating circuit 14, cool air is provided to the inlet of the gas turbine 32 via conduit 28. As previously described in connection with the operation of the heating tower 22, the cool air results from the heat exchange action that occurs between the cold liquid and ambient air within the heating tower 22.

The cool air travels through the conduit 28 to the gas turbine 32 inlet where it enters the gas turbine and where it is compressed by compressor of the turbine 32. Next, fuel, which is provided by the fuel supply 33, is mixed with the compressed, cool air and the mixture then moves onto the combustion chamber(s) where the mixture is ignited to generate high temperature gases which in turn drive the turbine 32. This driving of the turbine causes the generator 34 to generate power or electricity which, like the vaporized natural gas of the LNG vaporization circuit 12, can now be utilized in the marketplace. During operation of the gas turbine 32 as previously described, the exhaust from the gas turbine 32, generally designated 62, is utilized by the steam generator 36 to generate steam.

As depicted in FIG. 1, the gas turbine exhaust 62 is utilized by the steam generator to generate steam to power the steam turbine 48. During operation of the energy generating circuit 14, hot water from the condenser 38 is pumped to the cooling tower 42 via conduit 44 where heat exchange takes place and the water subsequently cooled. Once the water is cooled, it returns to the condenser 38 via conduit 46 where the cool water temperature assists to condense the hot steam exiting from the steam turbine 48, via conduit 56. The condensate then flows out of the condenser 38 through the conduit 40 and enters the steam generator 36 where it is heated and converted into steam. The steam then proceeds through conduit 50 where it enters and drives the steam turbine 48 and then returns to the condenser 38 via conduit 56. The aforementioned driving of the steam turbine 48, similar to that of the gas turbine 32, in turn drives the second generator 52 which accordingly generates electricity to be used in the marketplace.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A power generating system, comprising:
    a liquid natural gas (LNG) vaporization circuit, comprising:
        a heat exchange assembly;
        a heating tower connected to said heat exchange assembly;
        a liquid natural gas (LNG) vessel connected to said heat exchange assembly; and
        an energy generating circuit connected to said liquid natural gas (LNG) vaporization circuit,
    said energy generating circuit, comprising:
    a gas turbine connected to said heating tower; and
    a first electrical generator connected to said gas turbine, wherein said heat exchange assembly comprises:
        a first heat exchanger that provides heat exchange between heated water and an intermediate fluid; and
        a second heat exchanger that provides heat exchange between the intermediate fluid and the liquid natural gas (LNG).

2. The power generating system according to claim 1, wherein said energy generating circuit further comprises:
    a steam generator connected to said gas turbine and a steam turbine;
    a condenser connected to said steam generator; and
    a fluid cooler, wherein said fluid cooler is connected to said condenser and said heating tower.

3. The power generating system according to claim 2, wherein said energy generating circuit further comprises:
    a steam turbine connected to said steam generator and to said condenser; and
    a second electric generator connected to said steam turbine.

4. The power generating system according to claim 2, wherein said fluid cooler is at least one of a natural water source and a cooling tower.

5. The power generating system according to claim 2, wherein said fluid cooler is a counter flow cooling tower.

6. The power generating system according to claim 2, wherein said fluid cooler is a cross-flow cooling tower.

7. The power generating system according to claim 1, wherein said intermediate fluid is glycol.

8. The power generating system according to claim 1, wherein said heating tower comprises:
    an air flow inlet that provides an inlet air flow stream, wherein said air inlet comprises an inlet duct;
    an air flow outlet that provides an outlet air flow stream;
    a water distribution assembly; and
    a fill medium, wherein said liquid distribution assembly distributes water onto said fill medium,
    wherein said inlet duct isolates the inlet air flow stream from the outlet air flow stream.

9. The power generating system according to claim 8, wherein said inlet duct is generally hyperbolic in shape.

10. The power generating system according to claim 8, wherein said fill medium is cross-flow fill medium.

11. The power generating system according to claim 8, wherein said fill medium is counter flow fill medium.

12. The power generating system according to claim 1, further comprising:
    an air flow inlet that provides an inlet air flow stream;
    an air flow outlet that provides an outlet air flow stream, wherein said air flow outlet comprises an outlet duct; and
    a water distribution assembly; and
    a fill medium, wherein said water distribution assembly distributes water onto said fill medium,
    wherein said outlet duct functions to isolate the inlet air flow stream from the outlet air flow stream.

13. The power generating system according to claim 12, wherein said outlet duct has a generally rectangular shaped geometry and is oriented in a position that is approximately perpendicular to the vertical axis.

14. The power generating system according to claim 12, wherein said fill medium is cross-flow medium.

15. The power generating system according to claim 12, wherein said fill medium is counter flow medium.

16. A method for generating power using a gas turbine having an air inlet and heating water using a heating tower, comprising:
    drawing an air stream into the heating tower through an inlet to define an air inlet stream;
    passing the air inlet stream over a fill medium;
    passing the water over the fill medium;
    discharging the air stream from the heating tower through an outlet to define an air outlet stream;
    isolating the inlet air stream from the outlet air stream, wherein said step of isolating the inlet air stream utilizes an inlet duct that is generally hyperbolic in shape; and
    providing the outlet air stream to the gas turbine air inlet.

17. The method according to claim 16, further comprising providing the water to a heat exchanger, wherein the water is utilized to vaporize liquid natural gas (LNG).

18. A power generating system, comprising:
    a liquid natural gas (LNG) vaporization circuit, comprising:
        a heat exchange assembly wherein said heat exchange assembly comprises a first heat exchanger that provides heat exchange between heated water and an intermediate fluid; and a second heat exchanger that provides heat exchange between the intermediate fluid and the liquid natural gas (LNG);
        a liquid natural gas (LNG) vessel connected to said heat exchange assembly;
        a heating tower connected to said heat exchange assembly that produces cool water;
        an energy generating circuit, comprising:
        a gas turbine connected to said heating tower;
        a first electrical generator connected to said gas turbine; and
        a cool liquid conduit that transports the cool water between said liquid natural gas (LNG) vaporization circuit and said energy generating circuit.

19. The power generating system according to claim 18, wherein said energy generating circuit further comprises:
    a steam generator connected to said gas turbine and a steam turbine; and
    a condenser connected to said steam generator and a fluid cooler, wherein said fluid cooler cools condensate from said condenser.

20. The power generating system according to claim 19, wherein said energy generating circuit further comprises:
   a steam turbine connected to said steam generator and to said condenser; and
   a second electric generator connected to said steam turbine.

21. The power generating system according to claim 19, wherein said fluid cooler is at least one of a natural water source and a cooling tower.

22. A power generating system having an energy generating circuit, comprising a gas turbine connected to the power generating system and a first electrical generator connected to the gas turbine, comprising:
   a liquid natural gas (LNG) vaporization circuit, comprising:
   a heat exchange assembly wherein said heat exchange assembly comprises a first heat exchanger that provides heat exchange between heated water and an intermediate fluid; and a second heat exchanger that provides heat exchange between the intermediate fluid and the liquid natural gas (LNG);
   a heating tower connected to said heat exchange assembly; and
   a liquid natural gas (LNG) vessel connected to said heat exchange assembly.

23. The power generating system according to claim 22, wherein said energy generating circuit further comprises:
   a steam generator connected to said gas turbine and a steam turbine;
   a condenser connected to said steam generator; and
   a fluid cooler, wherein said fluid cooler is connected to said condenser and said heating tower.

24. The power generating system according to claim 23, wherein said energy generating circuit further comprises:
   a steam turbine connected to said steam generator and to said condenser; and
   a second electric generator connected to said steam turbine.

25. The power generating system according to claim 23, wherein said fluid cooler is at least one of a natural water source and a cooling tower.

* * * * *